(No Model.) 2 Sheets—Sheet 1.

W. C. BOONE.
APPARATUS FOR TRANSMITTING MOTION.

No. 431,030. Patented July 1, 1890.

WITNESSES:
Charles A. Herbert.
Charles Johnson

INVENTOR
William C. Boone
BY
James H. Whitney
ATTORNEY (No Model.) 2 Sheets—Sheet 2.
W. C. BOONE.
APPARATUS FOR TRANSMITTING MOTION.

No. 431,030. Patented July 1, 1890.

WITNESSES:
Charles A. Herbert
Charles Johnson

INVENTOR
William C Boone
BY
James A Whitney
ATTORNEY

UNITED STATES PATENT OFFICE.

WILLIAM C. BOONE, OF BROOKLYN, NEW YORK.

APPARATUS FOR TRANSMITTING MOTION.

SPECIFICATION forming part of Letters Patent No. 431,030, dated July 1, 1890.

Application filed January 17, 1890. Serial No. 337,162. (No model.)

*To all whom it may concern:*

Be it known that I, WILLIAM C. BOONE, of Brooklyn, in the county of Kings and State of New York, have invented certain new and useful Improvements in Apparatus for Transmitting Motion; and I do hereby declare that the following is a full, clear, and exact description of the invention, which will enable others skilled in the art to which it appertains to make and use the same.

This invention relates to that class of devices for transmitting motion between shafts placed at an angle to each other and provided with rods joined together in pairs, end to end, and sliding in holes or slots provided in the respective shafts.

The object of my invention is to secure greater permanence to the connecting-bars through which the motion is transmitted from one shaft to the other by subjecting the same to less strain when in operation, and of enabling the same to be made of such proportions that the power transmitted may approximate at least that of which the shafts themselves are capable of transmitting.

To this end my invention consists in a novel combination, with shafts placed at an angle to each other, of bosses fast upon the shafts and provided with longitudinal slots, sliding rods or bars arranged in said bosses placed in said slots, and universal joints connecting the adjacent ends of the rods or bars of the respective bosses, whereby motion may be transmitted regardless (within certain limits) of the degree or extent of the angle between the shafts.

Figure 1:
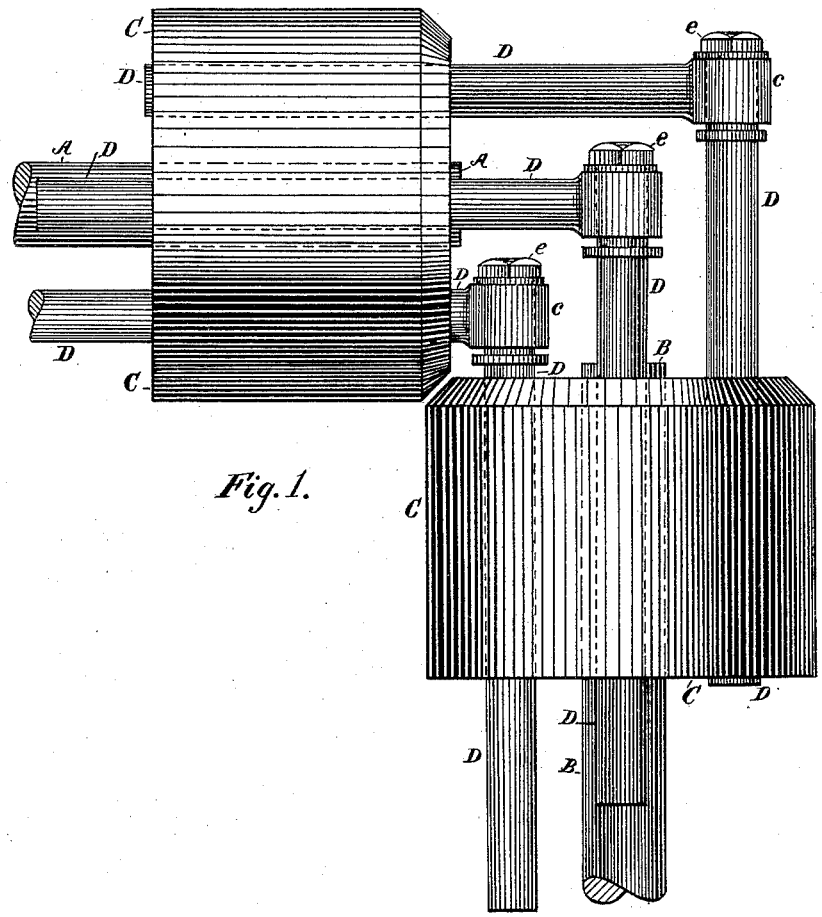
Figure 2:
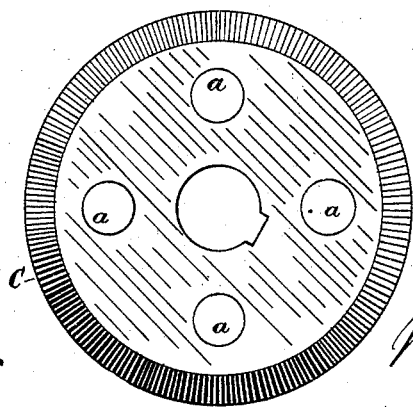
Figure 3:
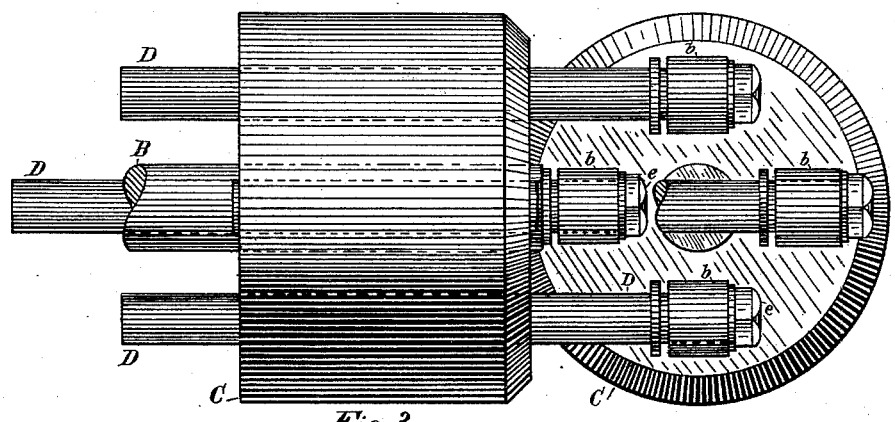
Figure 4:
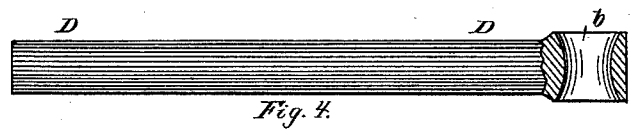
Figure 5:
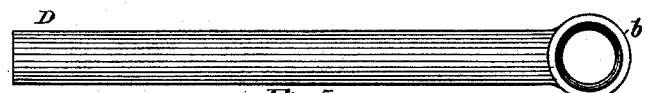
Figure 6:
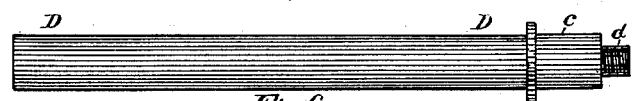
Figure 8:
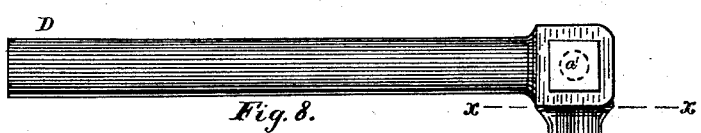
Figure 7:
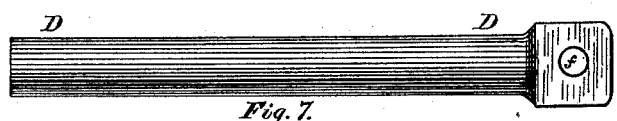
Figure 9:
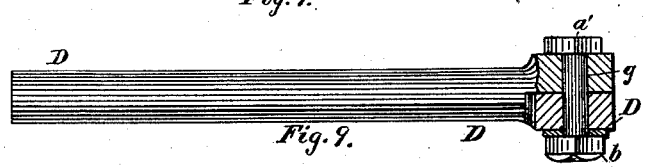

Figure 1 is a side view of an apparatus embracing my said invention. Fig. 2 is an end view of one of the bosses shown in Fig. 1. Fig. 3 is an end view of the parts represented in Fig. 1. Figs. 4 to 6, inclusive, are detail views of certain of the parts shown in Figs. 1 and 3, Fig. 4 being a partial sectional view of one part represented, Fig. 5 a side view of the part shown in Fig. 4, and Fig. 6 a side view of another part of the apparatus. Figs. 7 to 9, inclusive, represent a modification of the parts shown in Figs. 4, 5, and 6, Fig. 7 being a detail view of one of said parts, Fig. 8 a plan view showing two of such parts connected by a pivot, and Fig. 9 a sectional view taken in the line $x\ x$ of Fig. 8.

A and B are shafts placed at any desired angle, from one to the other of which motion is to be transmitted. To the adjacent ends of each of these shafts is provided a head or boss C. In each of these bosses C are provided any desired number of holes or slots $a$, parallel or substantially parallel with the shaft to which the boss is attached. Each boss is connected or otherwise secured to its shaft in such manner as to turn therewith. In each of the slots or holes $a$ is placed a sliding rod or bar D.

In order to provide the universal joint, as represented in Fig. 1 and also in Figs. 3 to 6, inclusive, I provide upon the end of one rod or bar D a socket, such, for example, as shown at $b$ in Fig. 4, which, it will be observed, is of such a shape that a suitable stem or bearing, being placed within, will permit the latter to be moved with its axis at a greater or less angle (acute or obtuse) to the axis of the bar D, to which said socket is provided. Thus, for example, if the bearing $c$ of the bar or rod shown in Fig. 6 be thrust into the socket represented in Figs. 4 and 5 the shaft having such bearing $c$ may be moved within a wide range to any desired angle to the shaft having the socket.

In the apparatus represented in Figs. 1 and 3 the boss C on the shaft B has its bar D provided with the bearings $c$, as shown in Fig. 6, and the boss C on the shaft A has its bars or rods D provided with the sockets $b$. (Shown in Figs. 4 and 5.) The bars D of the boss of the shaft B may also be provided with nuts $e$, screwed upon the threaded projections $d$ of said bars. The rotation of one of the shafts will of course carry around its bars or rods D in a path concentric with the axis of the shaft, and these bars, being connected, as described, with the adjacent ends of the corresponding bars of the other boss, will transmit the motion to said other boss, and consequently to the other shaft, the rods or bars playing in and out of their respective slots as they approach toward the inner side of the angle or recede toward the outer side thereof, a continuous and corresponding motion being thus transmitted by the rotation of one shaft to the other. It will be observed that by thus providing a substantially universal joint between the two parts of each pair of rods D the shafts A and B may within wide limits be placed at any desired angle to each other, and that motion will in such case be transmitted from one shaft to the other, even when the angle of the two shafts A and B departs widely from a right angle. By thus providing a universal joint to the rods D of the two shafts in place of the rigid connection heretofore used I am enabled to employ this class of mechanism in a wide range of conditions wherein heretofore it has been inadmissible.

The character and structure of the universal joint itself may be varied almost indefinitely. Thus, for example, as in the modification shown in Figs. 7, 8, and 9, each of the bars D is flattened at its end and provided with a bolt-hole $f$. When these bars D (shown in said Figs. 7, 8, and 9) are placed in position in the bosses C, the holes $f$ in the bars of the one boss are coincident with the holes $f$ in the bars of the other boss, and the two bars are secured together by a pivotal bolt $g$, having a suitable head $a'$ and nut $b'$, respectively, for holding the same in place, so that the two parts of each pair of rods D may move to different angles with each other, as required, in the transmission of motion from one shaft to the other when the said two shafts are placed in positions varying from the right angle.

It is to be observed that my said invention is useful even in those cases where the shafts A and B are designedly placed as near as may be at right angles to each other, inasmuch as any accidental displacement of said shafts from a substantially true right angle with regard to each other is compensated by the automatic adjustment of the parts by reason of the universal joints between the rods or bars D of one boss and those of the other.

I am aware that it has been heretofore proposed to transmit motion between shafts devoid of the heads or bosses and placed in the described or angular relation with each other by means of rods or bars sliding in slots provided longitudinally in the ends of said shafts, the outer ends of the rods or bars of one shaft being connected by universal joints with the adjacent ends of those of the other shafts. This arrangement is practically defective for the reason that the space necessarily afforded for the sliding rods or bars confines the size, and consequently the strength, of the latter within limits which render them inadequate to transmit more than a mere fraction from one shaft to the other of the power which the shafts themselves are capable of transmitting. Furthermore, by reason of the necessity of placing the sliding rods or bars closely adjacent to the axes of the shafts, a very great leverage is exerted upon the universal joints, which are thereby rendered liable to breakage, loosening, or rapid deterioration.

It is the object of my invention to obviate these defects, and this I accomplish by means hereinbefore described. By my said invention I provide for placing the sliding rods or bars at any desired distance from the axes of the shafts, thereby permitting said rods or bars to be made of a size commensurate with the transmission of the same degree of power as the shafts themselves. Furthermore, inasmuch as said rods or bars are placed at a greater distance from the axis of the shafts, the leverage upon them is proportionately reduced, and the strain is diminished accordingly. Furthermore, being thus enabled to employ sliding rods or bars of greater size and diameter, I am enabled to introduce a universal joint of correspondingly greater size and strength, and also to employ a construction of universal joint which is practically inadmissible where smaller sliding rods or bars are of necessity employed.

By the novel combinations of parts embraced in my said invention I secure greatly-improved results, and enable it in the class of mechanism heretofore inadequate to many purposes to be practically and successfully employed within a wide range of use. Furthermore, by means of my said invention I am enabled to replace the ordinary skew-gearing employed between shafts placed at an angle to each other without impairing the degree of power transmitted from the one shaft to the other, inasmuch as it is only necessary to remove such gearing and replace it by disks of suitable diameter provided with properly-proportioned sliding rods or bars and their connecting universal joints, as hereinbefore explained.

What I claim as my invention is—

1. The combination, with shafts placed at an angle to each other, of the heads or bosses C, placed upon said shafts, and provided with slots parallel with the axis thereof, rods or bars D, arranged to slide in said slots of said bosses, and universal joints connecting the rods or bars of the one boss with the corresponding rods or bars of the other, substantially as and for the purpose herein set forth.

2. The combination, with shafts placed at an angle to each other, of heads or bosses C, placed upon said shafts, and provided with slots parallel with the axes thereof, rods or bars D, having sockets $b$ and arranged to slide in the slots of one of the said bosses, and corresponding rods or bars having bearings $c$ and arranged to slide in the slots of the other of said bosses, substantially as and for the purpose herein set forth.

3. The combination, with the shafts placed at an angle to each other, of the slotted bosses fast upon said shafts, the rods or bars D, arranged to slide in the slots of one of the said bosses, and having the sockets $b$, the corresponding rods having the bearings $c$, constructed with threaded projections $d$, and the nuts $e$, substantially as and for the purpose herein set forth.

WILLIAM C. BOONE.

Witnesses:
 EM. BENEVILLE,
 CHARLES A. HERBERT.